US012809374B2

(12) United States Patent
Kaufman et al.

(10) Patent No.: US 12,809,374 B2
(45) Date of Patent: Nov. 24, 2026

(54) MOTION PLANNING WITH CASTER CONSTRAINTS

(71) Applicant: ASI Landscaping, LLC, Mendon, UT (US)

(72) Inventors: Evan Thomas Kaufman, Erie, CO (US); Zachary Austin Goins, Boudler, CO (US)

(73) Assignee: ASI Landscaping, LLC, Mendon, UT (US)

( * ) Notice: Subject to any disclaimer, the term of this patent is extended or adjusted under 35 U.S.C. 154(b) by 428 days.

(21) Appl. No.: 18/198,393

(22) Filed: May 17, 2023

(65) Prior Publication Data

US 2024/0385619 A1 Nov. 21, 2024

(51) Int. Cl.
*G05D 1/00* (2024.01)
*B60L 15/20* (2006.01)

(52) U.S. Cl.
CPC ............ *G05D 1/0223* (2013.01); *B60L 15/20* (2013.01); *B60L 2240/423* (2013.01); *B60L 2240/461* (2013.01)

(58) Field of Classification Search
CPC . G05D 1/0223; B60L 15/20; B60L 2240/423; B60L 2240/461
USPC ............................................................ 701/22
See application file for complete search history.

(56) References Cited

U.S. PATENT DOCUMENTS

| | | | | | |
|---|---|---|---|---|---|
| 5,974,347 | A * | 10/1999 | Nelson | A01D 34/008 | 701/410 |
| 9,056,629 | B2 * | 6/2015 | Kamo | G05B 15/00 | |
| 9,283,966 | B2 * | 3/2016 | Choi | B60T 8/172 | |
| 10,836,426 | B1 * | 11/2020 | Busboom | B62D 11/04 | |
| 10,926,756 | B2 * | 2/2021 | Dastous | A61G 5/04 | |
| 11,161,381 | B2 * | 11/2021 | Svensson | A01D 34/008 | |
| 11,399,995 | B2 * | 8/2022 | Coulter | H04W 12/08 | |
| 11,427,091 | B1 * | 8/2022 | Thompson | A01D 34/006 | |
| 11,464,161 | B1 * | 10/2022 | Phanco | A01D 34/008 | |
| 11,752,882 | B1 * | 9/2023 | Wittenschlaeger | B60L 15/20 | 701/22 |
| 12,204,350 | B1 * | 1/2025 | Davey | G05D 1/24 | |
| 2007/0051541 | A1 * | 3/2007 | Voto | B62D 11/003 | 180/65.1 |
| 2007/0073425 | A1 * | 3/2007 | Nakashima | B62K 5/027 | 700/71 |
| 2009/0000839 | A1 * | 1/2009 | Ishii | B62D 11/04 | 701/41 |
| 2010/0206651 | A1 * | 8/2010 | Nagasaka | B25J 5/007 | 180/218 |

(Continued)

FOREIGN PATENT DOCUMENTS

| | | | | |
|---|---|---|---|---|
| WO | WO-2021215980 A1 * | 10/2021 | | B60B 15/02 |
| WO | WO-2021228633 A1 * | 11/2021 | | B60B 33/023 |

*Primary Examiner* — Luis A Martinez Borrero

(57) ABSTRACT

Methods and apparatus for motion planning include receiving a path for movement of a body of a wheeled robot having first and second drive wheels and at least one non-driven caster wheel, the path defined by a series of points; determining, based at least in part on a constant difference in angular velocities between the first and second drive wheels, a set of control torques for the first and second drive wheels to control the robot to move between a first point of the series of points and a second point of the series of points; and applying the set of control torques to the first and second drive wheels.

17 Claims, 5 Drawing Sheets

(56) References Cited

U.S. PATENT DOCUMENTS

| | | | | |
|---|---|---|---|---|
| 2011/0202175 | A1* | 8/2011 | Romanov | A47L 11/4011 700/250 |
| 2012/0095636 | A1* | 4/2012 | Ishii | B60L 15/2036 701/22 |
| 2012/0159916 | A1* | 6/2012 | Ishii | B60L 58/40 56/10.2 G |
| 2012/0185122 | A1* | 7/2012 | Sullivan | G05D 1/0272 701/23 |
| 2013/0253769 | A1* | 9/2013 | Kamo | A61G 5/04 701/42 |
| 2014/0100736 | A1* | 4/2014 | Kim | A47L 11/4011 15/49.1 |
| 2014/0114559 | A1* | 4/2014 | Nakamura | B62K 11/007 701/124 |
| 2017/0001656 | A1* | 1/2017 | Katayama | A61H 3/04 |
| 2019/0179307 | A1* | 6/2019 | Anderson | A47L 11/28 |
| 2019/0256138 | A1* | 8/2019 | Jägenstedt | F16D 65/18 |
| 2020/0306998 | A1* | 10/2020 | Talebi | B25J 9/1638 |
| 2020/0406697 | A1* | 12/2020 | Svensson | B60G 3/26 |
| 2021/0089045 | A1* | 3/2021 | Kitano | G05D 1/0088 |
| 2021/0096574 | A1* | 4/2021 | Lee | A01D 34/00 |
| 2021/0378171 | A1* | 12/2021 | Barber | A01D 34/008 |
| 2022/0129013 | A1* | 4/2022 | Park | B25J 9/16 |
| 2022/0197295 | A1* | 6/2022 | Xu | A01D 34/008 |
| 2022/0369545 | A1* | 11/2022 | Kaufman | A01D 34/008 |
| 2022/0371582 | A1* | 11/2022 | Sato | B60W 30/10 |
| 2023/0082797 | A1* | 3/2023 | Kuno | G05D 1/0212 701/23 |
| 2023/0142590 | A1* | 5/2023 | Choi | A01D 34/008 701/2 |
| 2023/0152817 | A1* | 5/2023 | Huang | A01D 34/008 701/2 |
| 2023/0195132 | A1* | 6/2023 | Mochizuki | G01S 13/86 |
| 2023/0232745 | A1* | 7/2023 | Sato | A01D 34/008 56/321 |
| 2023/0288931 | A1* | 9/2023 | Wang | B25J 5/007 |
| 2023/0305563 | A1* | 9/2023 | Wang | G05B 19/042 |
| 2023/0309443 | A1* | 10/2023 | Xu | A01D 34/006 |
| 2023/0320266 | A1* | 10/2023 | Yang | B60L 15/025 |
| 2023/0363307 | A1* | 11/2023 | Yang | A01D 34/64 |
| 2023/0409035 | A1* | 12/2023 | Wang | B62D 57/028 |
| 2024/0107950 | A1* | 4/2024 | Xia | A01D 34/006 |
| 2024/0206381 | A1* | 6/2024 | Barber | A01D 34/008 |
| 2025/0040476 | A1* | 2/2025 | Kaufman | A01D 34/008 |

* cited by examiner

FIG. 3
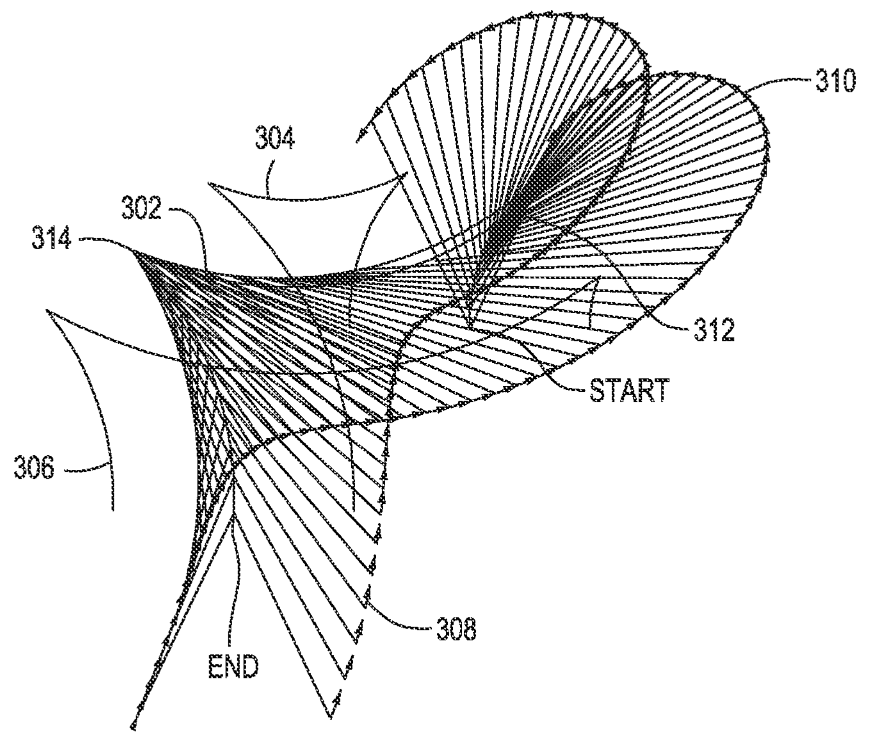
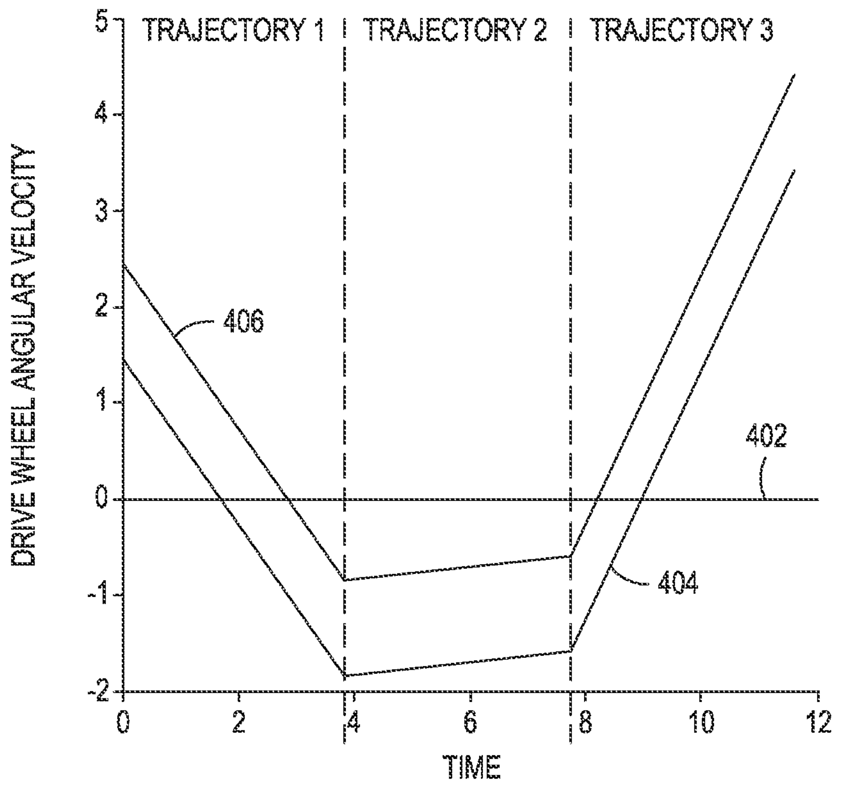
FIG. 4

MOTION PLANNING WITH CASTER CONSTRAINTS

BACKGROUND

Passive caster wheels on a mobile vehicle can provide support without actively controlling the motion of the vehicle. However, if caster wheels are transiently oriented poorly, they can produce significant resistance to motion and can even affect the ability of the vehicle to track a trajectory.

BRIEF DESCRIPTION OF THE DRAWINGS

Examples of the present disclosure, briefly summarized above and discussed in greater detail below, can be understood by reference to the illustrative examples of the disclosure depicted in the appended drawings. However, the appended drawings illustrate only typical examples of the disclosure and are therefore not to be considered limiting of scope, for the disclosure may admit to other equally effective examples.

FIG. 3 shows a path of a wheeled robot in accordance with examples of the present disclosure.

FIG. 4 is a graph of the angular velocity of port and starboard drive wheels of the wheeled robot as it moves along the path in FIG. 3.

Figure 1:
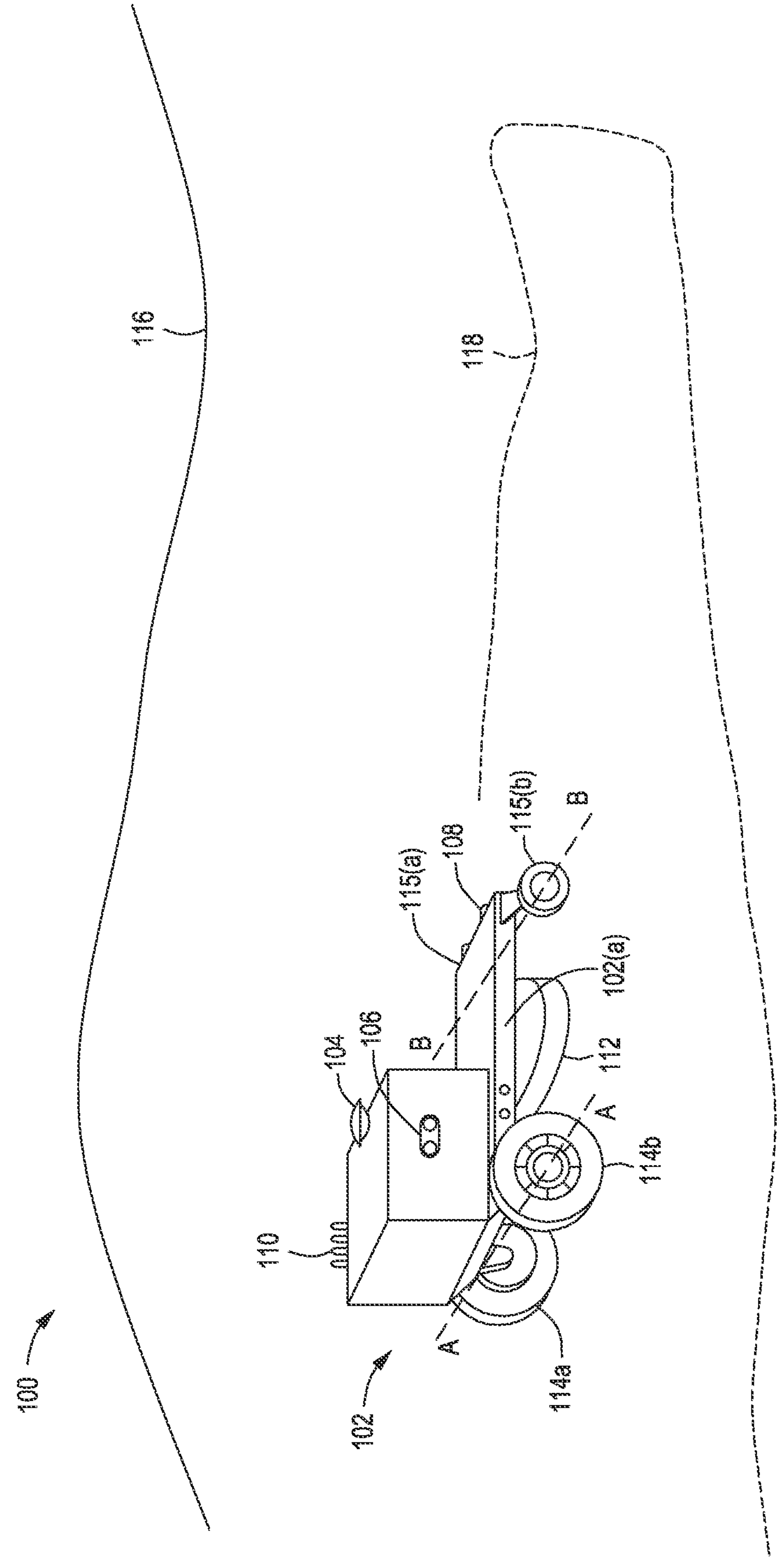
FIG. 1 illustrates an example of an autonomous lawn mower following a coverage pattern to mow a given area in accordance with examples of the present disclosure.

To facilitate understanding, identical reference numerals have been used, where possible, to designate identical elements that are common to the figures. The Figures are not drawn to scale and may be simplified for clarity. Elements and features of one example may be beneficially incorporated in other examples without further recitation.

DETAILED DESCRIPTION

As above, controlling motion of a system having at least one castor wheel to move about a path may yield scenarios in which naïve operation of the system places the castor wheel in an orientation which restricts or otherwise prohibits further motion. Therefore, described in detail herein are techniques, systems, and methods for modifying a planned path of a system and/or determining trajectories which diverge minimally from such a planned path while enabling smooth and constant motion despite having at least one wheel associated with a caster.

In various examples, the paths traversed may be optimized paths, such as those paths determined in accordance with co-owned U.S. Pat. No. 11,579,618, which is incorporated herein. In any such examples, the paths may be associated with, or otherwise inform, the system of torques to apply to one or more motors for causing the system to move along the path in a desired direction and/or speed. As a non-limiting example of which, various waypoints along the path may be provided to the system (or otherwise determined by the system) which inform the system of a desired state to attain (e.g., position, orientation, velocity, acceleration, blade speed, blade height, deck height, etc.)

The techniques describe the generation of control torques without causing binding of non-powered caster wheels of the wheeled robot. In some examples, the following description describes techniques for determining drive wheel angular velocities of a wheeled robot that guarantees any passive caster wheel direction is continuous, thereby reducing or eliminating the undesirable effects discussed above.

According to some examples, vehicle operating conditions or constraints for producing vehicle motions that guarantee continuous caster wheel motion are described herein. Such conditions may include constraints on caster placement on the wheeled robot, continuous drive wheel velocity, and constraints on when drive wheels may be controlled to 0 angular velocity. For example, in some examples, a constraint may be placed that the drive wheels may not be controlled to have 0 angular velocity at the same time. Of course, such a constraint may not be present in other examples discussed in detail herein.

In addition, according to some examples, a single 2D trajectory is described that satisfies the aforementioned conditions and which produces a closed-form solution from a double integral. Also, according to some examples, a technique is described for combining multiple of such 2D trajectories together that can produce a trajectory with continuous linear and angular velocity subject to constraints on a 2D location change, initial velocity, and final velocity provided some assumptions are satisfied. As discussed below, the aforementioned techniques may be understood using examples in which a wheeled robot trajectory is solved with continuous caster motion.

The techniques described in detail herein may improve the functioning of a computer. As a non-limiting example, the techniques may reduce the computational requirements (e.g., processing power, memory required, etc.) needed to determine control torques for a wheeled robot that allow the wheeled robot to traverse a path with continuous motion of caster wheels of the wheeled robot.

Although described herein with respect to a wheeled robotic lawn mower for purposes of illustration, the description is not meant to be so limiting. Any of the techniques, processes, and systems described herein may be used in conjunction with other agricultural and landscaping devices including, but not limited to weed eaters/wackers, edgers, trimmers, and the like, as well as any other power equipment or systems for covering an area. Details of such a system are described in detail below with respect to the figures.

While the foregoing is directed to examples of the present disclosure, other and further examples of the disclosure may be devised without departing from the basic scope thereof.

FIG. 1 illustrates an example of a system 100 for an autonomous lawn mower 102 (also referred to herein as "wheeled robot") to follow a mow pattern to mow a given region. The autonomous lawn mower 102 may comprise one or more sensors. As illustrated in FIG. 1, autonomous lawn mower is depicted with one or more Global Navigation Satellite System(s) (GNSS) 104, image sensors 106 (which may be RGB, monochromatic, infrared, ultraviolet, etc., as well as form the basis of stereo-(as depicted) or multi-view systems), and radar(s) 108. Though not depicted, the autonomous lawn mower 102 may comprise any other form of sensor for detecting environmental parameters and/or a state of the autonomous lawn mower 102 such as, but not limited to, lidar(s), inertial measurement unit(s) (IMU), accelerometer(s), gyroscope(s), magnetometer(s), wheel encoder(s), ultrasonic transducer(s), thermal imagers, ambient light sensor(s), time of flight sensors, barometer(s), bolometer(s), pyrometer(s), tilt sensor(s), and the like. Such sensors may be disposed about the autonomous lawn mower 102 in poses (i.e., positions and/or orientations) determined to optimize a field of view of all such sensors when combined. Image sensors 106 may comprise narrow field of view cameras and/or wide-angled cameras. Multiple image sensors 106 may be disposed about the autonomous lawn mower 102 to create various baselines (including dual baselines). All such sensors may be calibrated to determine one or more of intrinsics or extrinsics of the sensors.

The autonomous lawn mower 102 may further comprise, as depicted in the example illustrated, one or more antennae 110. Such antennae 110 may be used for one or more of wireless network communication, GNSS/GPS satellite reception, or any other form of electromagnetic signal transmission/reception.

The autonomous lawn mower 102 further comprises a deck 112. The deck 112 provides a housing for one or more blades in order to protect nearby objects from injury, to protect damage to the blades, as well as to control how vegetation is cut and directed after cut (e.g., to be ejected as mulch from the side of the deck 112, collected in a bag, or otherwise).

As depicted, the autonomous lawn mower 102 comprises a plurality of wheels 114, 115. In at least some examples, two rear drive wheels 114(*a*), 114(*b*) may be independently driven by one or more motors while front caster wheels 115(*a*), 115(*b*) are unpowered and freely rotate. While front caster wheels are shown in FIG. 1, rear caster wheels may alternatively or additionally be used. As shown in FIG. 1, the caster wheels 115(*a*) and 115(*b*) may be designated as a port caster wheel 115(*a*) and a starboard caster wheel 115(*b*) being located, respectively, on the port side and starboard side of the body 102(*a*) of the autonomous lawn mower 102. Likewise, as shown in FIG. 1, the drive wheels 114(*a*) and 114(*b*) may be designated as a port drive wheel 114(*a*) and a starboard drive wheel 114(*b*).

Figure 2:
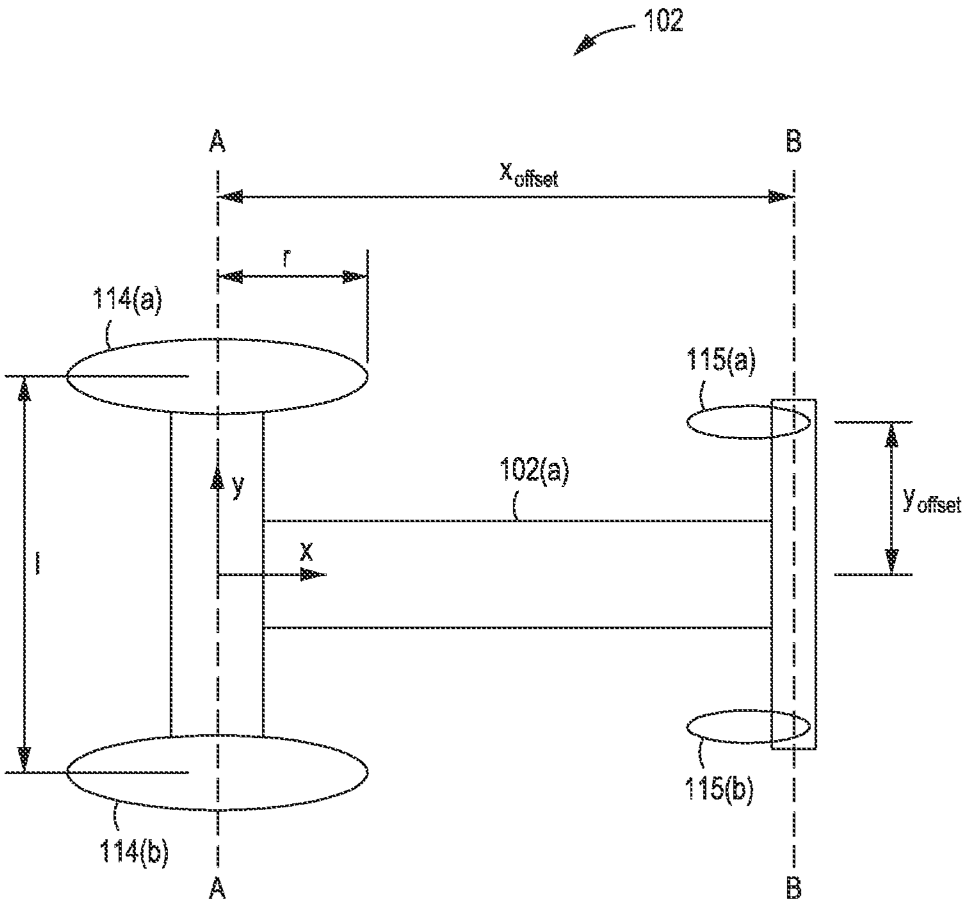
FIG. 2 is a schematic illustration of the autonomous lawn mower of FIG. 1.

As shown in FIG. 2, the drive wheels 114(*a*), 114(*b*) align along an axis A and the caster wheels 115(*a*), 115(*b*) are pivotally connected to the body 102(*a*) at locations that pass through an axis B that is spaced a distance $X_{offset}$ from the axis A. As discussed in greater detail below, in some examples such an $X_{offset}$ may be greater than 0. That is, in some examples the pivot axis of the caster wheels 115(*a*) and 115(*b*) may not be positioned along the same axis (e.g., axis A) as the drive wheels 114(*a*), 114(*b*).

In some examples, and as shown in FIGS. 1 and 2, the drive wheels 114(*a*), 114(*b*) can only rotate about axis A and, thus, can only move the autonomous lawnmower 102 tangent to its orientation. In other words, the autonomous lawnmower 102 can move forward or backward (i.e., along axis X in FIG. 1), but not with a lateral component of motion (i.e., along axis Y in FIG. 1).

When mowing, the autonomous lawn mower 102 may be provided with a perimeter 116. The perimeter 116 may form the boundary of a given area for the autonomous lawn mower 102 to cover. As described in detail herein, a coverage planner may generate a coverage plan for the autonomous lawn mower to follow. The coverage plan may comprise a path 118 and/or series of subpaths for the autonomous lawn mower 102 to traverse. The coverage plan may ensure that the autonomous lawn mower visits every region of the area bounded by perimeter 116 and, in at least some examples, in an efficient manner to minimize a total time to mow, an amount of energy required to mow, and/or so as to result in a desired aesthetically pleasing pattern.

As shown in FIGS. 1 and 2, each caster wheel 115(*a*), 115(*b*) is located toward the front of the autonomous lawn mower, $X_{offset}$ from the shared drive wheel axis A and $Y_{offset}$ in the lateral direction from the Y axis tangent to vehicle motion. In the example shown in FIGS. 1 and 2, $X_{offset}$ is the same for each caster wheel 115(*a*), 115(*b*) and $Y_{offset}$ is equal and opposite for each caster wheel 115(*a*), 115(*b*). The body-fixed linear velocity $v_b(t)$ and angular velocity $\omega_b(t)$ of the wheeled robot 102 shown in FIGS. 1 and 2, may be represented as $$v_b(t) = (\omega_s(t) + \omega_p(t))r/2, \tag{1}$$

$$\omega_b(t) = (\omega_s(t) + \omega_p(t))r/l, \tag{2}$$

where $\omega_s(t)$ is the angular velocity of the starboard drive wheel 114(*b*), $\omega_p(t)$ is the angular velocity of the port drive wheel 114(*a*), r is the drive wheel radius common to both drive wheels 114(*a*), 114(*b*), and l is the drive wheel separation.

The velocity of each caster wheel 115(*a*), 115(*b*) $v_{caster}$ with respect to the body 102(*a*) may be represented as $$v_{caster}(t) = [v_b(t), 0]^T + [-\omega_b(t)y_{offset}, \omega_b(t)x_{offset}]^T = r\left(\left[\frac{1}{2} - \frac{y_{offset}}{l}, \frac{x_{offset}}{l}\right]^T \omega_s(t) + \left[\frac{1}{2} + \frac{y_{offset}}{l}, -\frac{x_{offset}}{l}\right]^T \omega_p(t)\right). \tag{3}$$

The tangential caster wheel direction with respect to the body 102(*a*) is determined by the direction of $v_{caster}(t)$ using a tan $2(v_{caster}(t)\cdot[0, 1]^T, v_{caster}(t)\cdot[1, 0]^T)$. In those examples in which the transitions between $$\frac{\pi}{2} \text{ and } -\frac{\pi}{2}$$

are continuous, the angle of each caster wheel 115(*a*), 115(*b*) may be determined such that both $\omega_s(t)$ and $\omega_p(t)$ are continuous and the x-component and y-component do not change sign at the same time.

In some examples, the x-component and y-component may both cross 0 at the same time. In such examples, the y-component of $v_{caster}(t)$ as it crosses 0 is $$\frac{x_{offset}}{l}\omega_s(t) - \frac{x_{offset}}{l}\omega_p(t) = 0. \tag{4}$$

Further in such examples, the angular velocities of the starboard and port drive wheels 114(*b*) and 114(*a*) may be $\omega_s(t)=\omega_p(t)$ and/or $x_{offset}=0$. In those examples in which the y-component is 0, the angular speed of the port wheel may be equivalent to the angular speed of the starboard wheel. This condition corresponds to straight forward or backward motions of the wheeled robot 102, or when the wheeled robot 102 is stopped.

Further in such examples, the x-component of $v_{caster}(t)$, as it crosses 0, may be defined by:

$$\left(\frac{1}{2} - \frac{y_{offset}}{l}\right)\omega_s(t) + \left(\frac{1}{2} + \frac{y_{offset}}{l}\right)\omega_p(t) = 0. \tag{5}$$

In various examples, control solutions may be defined in which either the port drive wheel 114(*a*) or the starboard drive wheel 114(*b*) may be allowed to have a zero angular velocity, but not at the same time. Such examples may avoid a discontinuity in tangential caster direction.

In those examples which solve for vehicle dynamics/kinematics/controls which considers the above, three control constraints may be imposed to achieve continuous caster wheel movement during motion of the body 102 including: 1) that the pivot axes of the caster wheels 115(*a*), 115(*b*) do not pass through the drive wheel axis A; 2) that the commanded drive wheel angular velocities are continuous (no instant jump in commanded drive wheel angular velocity for either port or starboard drive wheels 114(*a*), 114(*b*)); and 3) that the drive wheel angular velocities are not commanded to change sign at the same time.

To control the wheeled robot 102 to move along a pathway in Cartesian space, it is useful to represent wheel motions in Cartesian space (despite the received plan being in some other coordinate system such as, but not limited to, body-centric). In some examples, trajectories inside the wheel space are defined to make it easier to apply the above-noted control constraints. Then, the defined trajectories may be mapped into Cartesian coordinates.

A heading, or orientation, of the system may be defined as follows:

$$\theta_b(t) = \frac{r}{l}\int_0^t (\omega_s(\tau) - \omega_p(\tau))d\tau, \tag{6}$$

where $\omega_s$ is the angular velocity of the port drive wheel 114(*a*), and $\omega_p$ is the angular velocity of the starboard drive wheel 114(*b*). Such an orientation may be used to define a rotation matrix which be used to transform data (e.g., a vector, point, etc.) from a point in an initial reference frame (which may be based on the system to define an origin) to any subsequent frame of reference. Such a rotation matrix may then be defined as:

$$R_{0,t} = [\cos\theta_b(t), -\sin\theta_b(t); \sin\theta_b(t), \cos\theta_b(t)]. \tag{7}$$

As discussed above, for the example of the wheeled robot 102 of FIGS. 1 and 2, motion of the wheeled robot 102 may be constrained based at least in part on its orientation. Thus, for simplicity, the body-fixed direction may be initialized to be $[1, 0]^T$, so only the first column of $R_{0,t}$ is relevant (e.g., the body-centric orientation of the system at any point in time may be defined such that the system is always moving in along a fixed axis—such as the longitudinal axis, x). Then the Cartesian coordinates may be integrated as $$x(t) = \frac{r}{2}\int_0^t \cos\left(\frac{r}{l}\int_0^\tau (\omega_s(\psi) - \omega_p(\psi))d\psi\right)(\omega_s(\tau) + \omega_p(\tau))d\tau, \tag{8}$$

$$y(t) = \frac{r}{2}\int_0^t \sin\left(\frac{r}{l}\int_0^\tau (\omega_s(\psi) - \omega_p(\psi))d\psi\right)(\omega_s(\tau) + \omega_p(\tau))d\tau. \tag{9}$$

Specific Solutions

Since equations (8) and (9) include embedded integrals, for ease of computation, it may useful in some examples to determine function types for $\omega_s(t)$ and $\omega_p(t)$ that will obtain closed form solutions to equations (8) and (9), rather than numerically integrate the solution. Such examples may reduce computational resources required and improve the functioning of the computer. Thus, in some examples, $\omega_s(t)$ and $\omega_p(t)$ are determined as belonging to a specific set of functions with parameters designed to achieve various trajectory options with closed form solutions to equations (8) and (9).

Straight Line Motion Control

As noted above, a straight line trajectory of the wheeled robot 102 may be produced when both the port and starboard drive wheels 114(*a*) and 114(*b*) are commanded to rotate at the same angular velocity. For example, where $\omega_s(t)=\omega_p(t)=\omega_{both}(t)$ where $\omega_{both}(t)\neq 0$ for all t is the commanded constant drive wheel angular velocity, the following trivial results are produced.

$$\theta_b(t) = 0, \tag{10}$$

$$x(t) = (r\omega_{both}(t))t, \text{ and} \tag{11}$$

$$y(t) = 0. \tag{12}$$

Thus, the angle $\theta_b$ of the body 102(*a*) remains at 0 and the wheeled robot 102 moves only in the x direction in FIG. 2.

Closed-Form Solution Using Constant Angular Velocity Difference

A closed-form solution to equations (8) and (9) may also be obtained by considering a constant angular velocity difference between the port and starboard drive wheels 114(*a*) and 114(*b*), which may generate a non-linear trajectory. In one example, functions for the angular velocity of the port and starboard drive wheels 114(*a*) and 114(*b*) may be selected such that the difference of the angular velocity of the port and starboard drive wheels 114(*a*) and 114(*b*) yields a linear function, which may eliminate the embedded integral of equations (8) and (9). For example, the angular velocities of the starboard and port drive wheels 114(*b*) and 114(*a*), $\omega_s(t)$ and $\omega_p(t)$, respectively, may be represented as $$\omega_s(t) = \frac{1}{2}f(t) + \frac{l}{2r}\omega_{diff}, \tag{13}$$

$$\omega_p(t) = \frac{1}{2}f(t) - \frac{l}{2r}\omega_{diff}, \tag{14}$$

where $f(t)$ is a function applied to both $\omega_s(t)$ and $\omega_p(t)$ identically and $\omega_{diff}$ is an angular velocity of the body 102(*a*) throughout the trajectory beginning with t=0 and ending with t=T>0. The difference between $\omega_s(t)$ and $\omega_p(t)$ can be rewritten as:

$$\omega_s(t) - \omega_p(t) = \frac{l}{r}\omega_{diff} = \frac{l}{r}(\omega_{s,0} - \omega_{p,0}) = \frac{l}{r}(\omega_{s,T} - \omega_{p,T}) \tag{15}$$

which is constant through time t=0 to terminal time t=T with initial and terminal conditions, namely port and starboard starting and terminal drive wheel angular velocities $\omega_{p,0}$, $\omega_{p,T}$, $\omega_{s,0}$ and $\omega_{s,T}$. Therefore, $\omega_{diff}$ may be written as $$\omega_{diff} = \frac{r}{l}(\omega_{s,0} - \omega_{p,0}), \tag{16}$$

which can be understood as the constant drive wheel angular velocity difference scaled by body configuration-dependent parameters r and l. The angular velocity $\omega_{diff}$ of the robot body 102(*a*) may then be integrated to obtain the angle of the body 102(*a*) as $$\theta_b(t) = \frac{r}{l}\int_0^t \frac{l}{r}\omega_{diff}\,d\tau = \omega_{diff}t. \tag{17}$$

Other simplifications can be made to achieve a closed form solution to equations (8) and (9) by imposing a constraint that the angular velocity difference between the port and starboard drive wheels 114(*a*) and 114(*b*) is the same at the starting time t=0 and at the terminal time t=T in the trajectory. In some examples, $f(t)$ may be a linear function $$f(t) = mt + b, \tag{18}$$

where m represents the rate of change of the angular velocities of the port and starboard drive wheels 114(*a*), 114(*b*) and b is used to handle the initial condition. Applying the initial condition to the starboard side equation (13) yields $$\omega_{s,0} = \frac{1}{2}f(0) + \frac{l}{2r}\omega_{diff} = \frac{1}{2}m(0) + \frac{1}{2}b + \frac{l}{2r}\omega_{diff} \Rightarrow b = 2\omega_{s,0} - \frac{l}{r}\omega_{diff}. \tag{19}$$

Substituting b and applying the starboard terminal condition produces $$\omega_{s,T} = \frac{1}{2}mT + \omega_{s,0} - \frac{l}{2r}\omega_{diff} + \frac{l}{2r}\omega_{diff} = \frac{1}{2}mT + \omega_{s,0}. \tag{20}$$

In one example trajectory, a change of the angle of the body 102(*a*) may be achieved by choosing the terminal time T as $T=\theta/\omega_{diff}$. Substituting into the equation above, the linear slope m reduces to $$m = \frac{2\omega_{diff}}{\theta}(\omega_{s,T} - \omega_{s,0}). \tag{21}$$

Thus, given the foregoing simplifications, for a constant angular velocity difference between the port and starboard drive wheels 114(*a*) and 114(*b*), the closed form solution to equations (8) and (9) become $$x(t) = \frac{r}{2}\int_0^t \cos(\omega_{diff}\tau)(m\tau + b)\,d\tau \tag{22}$$

$$x(t) = \frac{r}{2\omega_{diff}^2}(\omega_{diff}(b + mt)\sin(\omega_{diff}t) + m\cos(\omega_{diff}t) - m), \tag{23}$$

$$y(t) = \frac{r}{2}\int_0^t \sin(\omega_{diff}\tau)(m\tau + b)\,d\tau \tag{24}$$

$$y(t) = \frac{r}{2\omega_{diff}^2}(-\omega_{diff}(b + mt)\cos(\omega_{diff}t) + m\sin(\omega_{diff}t) + b\omega_{diff}). \tag{25}$$

In various examples, such equations may, in turn, be used to control the system by determining a desired velocity, torque, voltage, etc. and applying those determined values to the appropriate motors.

In some examples, to control motion of the wheeled robot 102 between any two points in a series of points, the two points may be connected with multiple (e.g., three) trajectories that satisfy the constraints of starting position, ending position, starting velocity, and ending velocity. In some examples where three trajectories are used, such three-part trajectories can be used to connect any two points that involve some vehicle rotation, such as, a turn between mowing stripes.

In some examples, various control constraints and scenarios for transitioning between trajectories may be considered to patch together or otherwise connect multiple trajectories together and to solve for conditions at connection points of trajectories.

System of Linear Equations to Solve for a Terminal Condition

Constraining Translational and Directional Change

The Cartesian equations for x(t) and y(t) discussed herein (e.g., equations (23) and (25)) can be used to produce a trajectory to a 2D location. For example, if $\omega_{diff}$ is known, either because the angular velocities of the port and starboard drive wheels 114(*a*) and 114(*b*) have at least the appropriate directional difference, or a minimum magnitude threshold is selected to get the wheeled robot 102 turning in a particular direction, then the single generalized trajectory can be solved with terminal constraints as $$[x_{diff}, y_{diff}]^T = A(T)[m, b]^T, \tag{26}$$

where A(T) is the matrix:

$$\frac{r}{2\omega_{diff}^2} *$$

| | |
|---|---|
| $\omega_{diff}^T \sin(\omega_{diff}^T) + \cos(\omega_{diff}^T) - 1$ | $\omega_{diff}^{sin}(\omega_{diff}^T)$ |
| $\sin(\omega_{diff}^T) - \omega_{diff}^T \cos(\omega_{diff}^T)$ | $\omega_{diff}(1 - \cos(\omega_{diff}^T))$ |

The matrix A(T) is invertible if its determinant, $$\det(A(T)) = \frac{r}{2\omega_{diff}}(-2 + 2\cos(\omega_{diff}T) + \omega_{diff}T\sin(\omega_{diff}T)), \tag{27}$$

is nonzero. In this example, T>0 is true and $\omega_{diff}\neq 0$ is true to prevent T from being infinite. Therefore, $\theta=\omega_{diff}T\neq 0$ must be true, and θ cannot be a multiple of 2π, which would yield a zero determinant. This means that the solution cannot provide a trajectory that fully loops. It can be verified numerically that $\det(A(T))\neq 0$ if $0<|\theta|<2\pi$. Hence, assuming the rotation angle θ of the body 102(*a*) is nonzero and less than a full rotation in magnitude, the linear function parameters can be solved for $$[m, b]^T = A^{-1}[x_{diff}, y_{diff}]^T. \tag{28}$$

Constraints on Initial Lateral Velocity to be 0

A linear velocity constraint may be added to patch or otherwise connect two trajectories together, where their connecting location has no instantaneous change in drive wheel angular velocity. In some examples, a constraint on initial velocity is included by adding a second trajectory to a first trajectory.

The linear velocity of a trajectory is:

$$\dot{x}(t)=\frac{1}{2}r(mt+b)\cos(\omega_{diff}t), \tag{29}$$

so the initial linear velocity at time t=0 is $$v_{lin,start}=\frac{1}{2}rb. \tag{30}$$

Therefore, to start movement of the wheeled robot 102 with forward motion, b>0 must be true for entering a turn in the forward direction. Hence, the initial linear velocity $\dot{x}(0)$ may be used as a constraint, which both determines the velocity at which the wheeled robot 102 enters a turn, and guarantees the direction of how the turn starts, which is known deterministically from a command to the wheeled robot, e.g., a stripe.

Constraining Translational Change, Directional Change, and Initial Velocity with Two Trajectories Additionally, two trajectories must connect smoothly. To achieve this, the angular velocities of the drive wheels 114(*a*), 114(*b*) may be constrained to be the same at the patch or connection point between the two trajectories, e.g., $m_1T_1+b_1=b_2$ and $\omega_{diff}$ does not change. These constraints may be combined into a matrix $M_{2\ traj}$ for two trajectories as

| A | | $R_{\frac{\theta}{2}}A$ | |
|---|---|---|---|
| $T_{\frac{\theta}{2}}$ | 1 | 0 | −1 |
| 0 | 1 | 0 | 0 |

where $$T_{\frac{\theta}{2}}$$

is the terminal time to reach halfway to θ and $$R_{\frac{\theta}{2}}$$

is the rotation matrix corresponding to that attitude transformation. Then, using constraints $$C_{2traj}=\left[x_{diff},\ y_{diff},\ 0,\ \frac{2v_{lin,start}}{r}\right]^T,$$

the function parameters for both trajectories can be solved as $$[m_1,\ b_1,\ m_2,\ b_2]^T=M_{2traj}^{-1}c_{2traj}. \tag{31}$$

Constraining Translational Change, Directional Change, Initial Velocity, and Final Velocity with 3 Velocities In some examples, including a third trajectory allows for an additional velocity constraint, thereby providing a set of trajectories between any two locations with initial and terminal velocities while also satisfying continuous caster motion constraints discussed herein. Much like the prior solution, a third trajectory may be added as another constraint on terminal velocity. The terminal velocity of the third and final trajectory segment is $$v_{lin,end}=\frac{1}{2}r\left(m_3T_{\frac{\theta}{3}}+b_3\right). \tag{32}$$

A three-trajectory constraint matrix $M_{3\ traj}$ is

| A | | $R_{\frac{\theta}{3}}A$ | | $R_{\frac{2\theta}{3}}A$ | |
|---|---|---|---|---|---|
| $T_{\frac{\theta}{3}}$ | 1 | 0 | −1 | 0 | 0 |
| 0 | 1 | 0 | 0 | 0 | 0 |
| 0 | 0 | $T_{\frac{\theta}{3}}$ | 1 | 0 | −1 |
| 0 | 0 | 0 | 0 | $T_{\frac{\theta}{3}}$ | 1 |

which corresponds to constraints vector $$c_{3traj}=\left[x_{diff},\ y_{diff},\ 0,\ \frac{2v_{lin,start}}{r},\ 0,\ \frac{2v_{lin,end}}{r}\right]^T.$$

The function parameters are similarly solved as $$[m_1,\ b_1,\ m_2,\ b_2,\ m_3,\ b_3]^T=M_{3traj}^{-1}c_{3traj}. \tag{33}$$

While the examples provided above discuss how multiple trajectories may be spliced together, the techniques described herein may use any number of trajectories. Furthermore, the number of such trajectories may be determined based at least in part on kinematic and/or dynamic constraints (e.g., 2, 3, or more trajectories may be required to control the system between two consecutive waypoints or points associated with a path) or otherwise. In various examples, the trajectories may be equivalent temporally (e.g., each trajectory of the set may require the same amount of time to traverse), spatially (e.g., each trajectory may have a same or similar arc length), or otherwise (asymmetric temporally and/or spatially).

NUMERICAL EXAMPLES

FIGS. 3 and 4 show numerical examples of types of trajectories possible with the closed-form solutions in accordance with the present disclosure. In FIG. 3, thick arrows 302 show the location and direction of the body 102(*a*) (at a midpoint of the drive wheels 114(*a*), 114(*b*) along axis A) of the wheeled robot 102. The thin line 304 shows the movement of the starboard drive wheel 114(*b*). The thin line 306 shows the movement of the port drive wheel 114(*a*). The thin arrows 308 show the motion of the starboard caster wheel 115(*b*) and the thin arrows 310 show the motion of the port caster wheel 115(*a*). The tails of arrows 308 and 310 are connected via the associated line color to the position of the body 102(*a*) of the wheeled robot 102. As shown in FIG. 3, the caster wheels 115(*a*), 115(*b*) are directed opposite to the motion of the body 102(*a*) at the caster wheel location. FIG. 3 shows a path from a start point to and end point that includes a first trajectory between the start to point 312, a second trajectory between point 312 and point 314, and a third trajectory between point 314 and the end point.

FIG. 4 shows the angular velocity of the port and starboard drive wheels 114(*a*) and 114(*b*) along the three trajectories shown in FIG. 3. In FIG. 4, the black line 502 is at 0, corresponding to a wheel being stationary. Also, the line 504 shows the angular velocity of the starboard drive wheel 114(*b*) and the line 506 shows the angular velocity of the port drive wheel (114*a*). FIG. 4 illustrates the control constraints described herein. As shown in FIG. 4, in each trajectory, there is a constant difference in angular velocity between the port and starboard drive wheels 114(*a*) and 114(*b*). Also, as shown in FIG. 4, the angular velocity of the port and starboard drive wheels 114(*a*) and 114(*b*) do not change sign (do not cross 0) at the same time.

Figure 5:
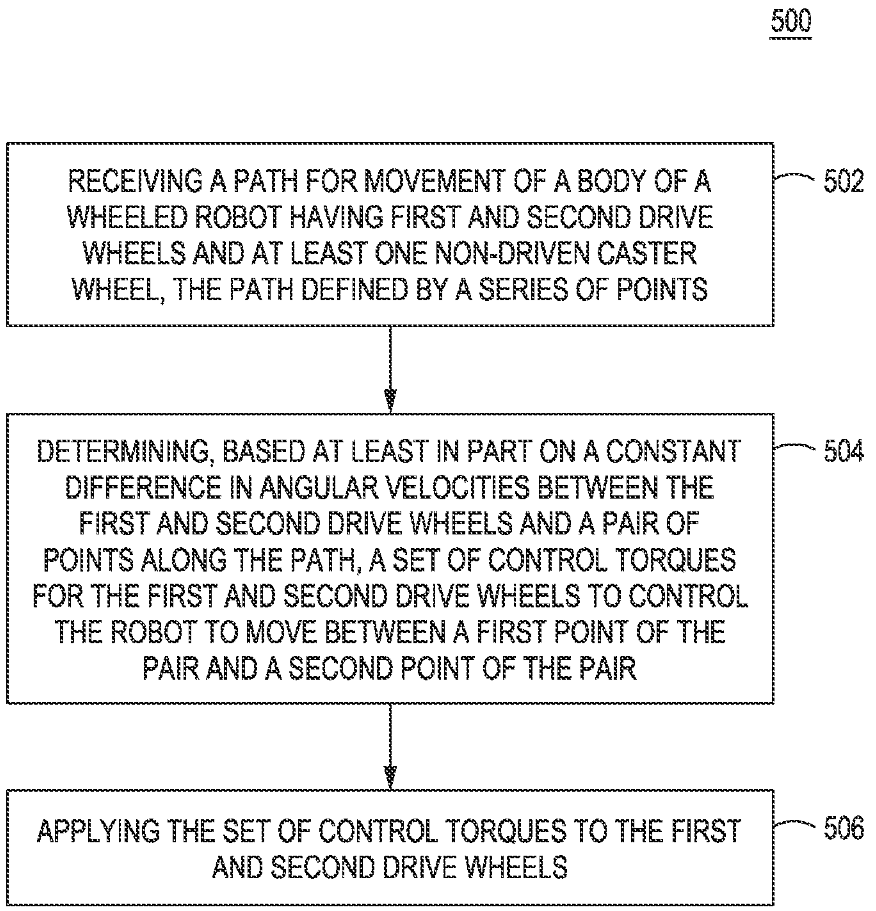
FIG. 5 is a flow chart illustrating a method of motion planning in accordance with examples of the present disclosure.

FIG. 5 shows an example of a method 500 for motion planning in accordance with the present disclosure. At 502, a path is received for movement of a body (e.g., 102(*a*)) of a wheeled robot (e.g., 102) having first and second drive wheels (e.g., 114(*a*), 114(*b*)) and at least one non-driven caster wheel (e.g., 115(*a*), 115(*b*)). The path is defined by a series of points. For example, the path may be the path shown in FIG. 3 from the start point to the end point and include additional points 312 and 314. At 504 the method may also include determining, based at least in part on a constant difference in angular velocities between the first and second drive wheels and a pair of points along the path, a set of control torques for the first and second drive wheels to control the wheeled robot to move between a first point of the pair and a second point of the pair. For example, as shown in FIG. 3, a set of control torques may be determined for the port and starboard drive wheels 114(*a*) and 114(*b*) to control the wheeled robot 102 to move between the start point and the end point. At 506, the set of control torques to the first and second drive wheels may be applied in order to get the wheeled robot to move between the first and second points.

In some examples, to follow the trajectories, two proportional-integral-derivative (PID) controllers may be applied independently to obtain (i) a controlled force and (ii) a controlled moment, both with respect to the body (e.g., 102(*a*)) of the wheeled robot (e.g., 102). The controlled force (i) may be determined for wheeled robot 102 translation and the controlled moment (ii) may be determined for wheeled robot 102 rotation. For both control schemes (i) and (ii), the wheeled robot 102 may produce adequate force and moment via the drive wheels 114(*a*) and 114(*b*) to follow a point along the trajectory just slightly ahead of where the wheeled robot 102 is currently located. For proportional control, the wheeled robot 102 may apply force to correct its forward/backward location relative to that point and may apply a moment to correct a yaw angle of the wheeled robot 102 toward that point. For derivative control, the linear and angular velocities from the trajectories may be followed. The integral control may account for any accumulating offsets in position, linear velocity, angle, and angular velocity. Additionally, other anticipated efforts, such as accelerating the wheeled robot 102 according to the trajectory, accounting for vehicle friction, and compensating for gravitational forces and moments, may be included in controller terms. Also, the drive wheel torques may be determined by a linear mapping between the controlled force and controlled moment based on geometry of the wheeled robot 102.

In some examples, determining the set of control torques may include determining a first trajectory to cause the robot to move from the first point to a third point and determining a second trajectory to cause the robot to move from the third point to the second point, wherein the first and second trajectories are used to constrain at least one of a translational change between the first and second points, a directional change between the first and second points, or a velocity of the robot at the first point. For example, as described above, FIGS. 3 and 4 show multiple trajectories that constrain at least one of a translational change between the start and end points, a directional change between the start and end points, or a velocity of the wheeled robot 102 at the start point.

In some examples, as a control constraint a difference in heading between the first point and the second point of the pair of points may not be a multiple of $2\pi$. That is, the wheeled robot 102 may be controlled to avoid headings that would put the wheeled robot 102 on a course that is a multiple of $2\pi$ radians (avoid loops), which may result in caster wheel movement that is not continuous.

In some examples, the method may include receiving additional paths at a frequency; and repeating, for each additional path, the determining the set of control torques, wherein the set of control torques are determined at a frequency greater than the frequency of receiving additional paths.

In some examples, determining the set of control torques comprises solving a system of equations to determine constants of a temporally linear function, and wherein an angular velocity of the first drive wheel is based at least in part on the temporally linear function plus a difference (e.g., equation 13) and the angular velocity of the second drive wheel is based at least in part on the temporally linear function minus the difference (e.g., equation 14). For example, in some examples, the set of control torques may be determined at least in part by solving the system of equations (8) and (9) described above to determine the constants of the temporally linear function (18), where the angular velocities of the port and starboard drive wheels 114(*a*) and 114(*b*) are related by equations (13) and (14).

Example System

Figure 6:
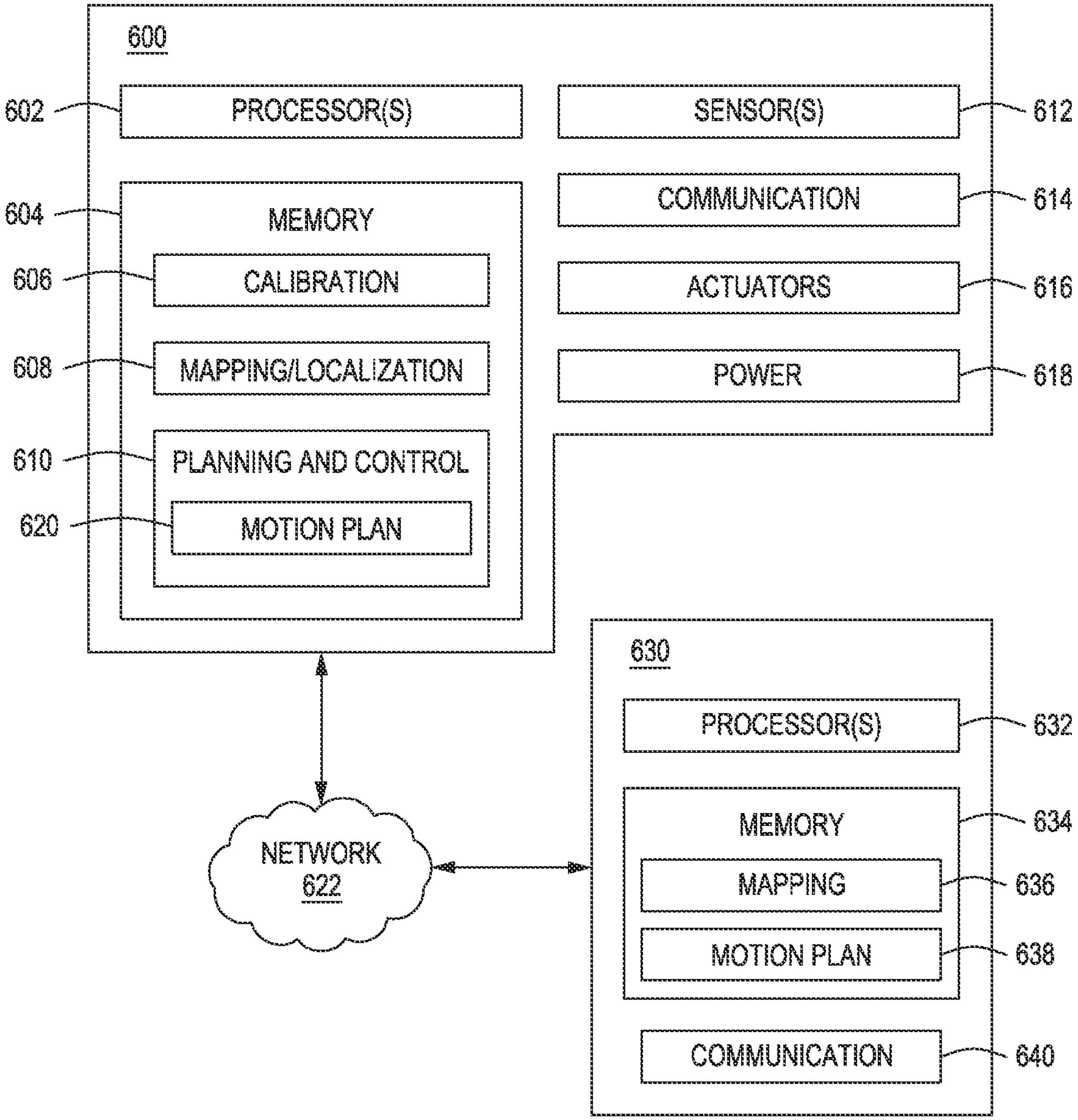
FIG. 6 depicts an example system in accordance with examples of the present disclosure.

FIG. 6 is an example system 600 capable of performing the operations described herein. Such a system 600 may comprise one or more of processors 602, memory 604, sensor(s) 612, communication subsystem 614, actuators 616, and power system 618. Further, though depicted in FIG. 6 as a single system 600 for illustrative purposes, the intention is not to be so limiting. For example, the system 600 may be a distributed system (either locally or non-locally), where each block may be present on (or performed by) a remote system. Further, though particular blocks are associated with individual systems or subsystems, the disclosure is not meant to be so limiting. Indeed, any block may be present in any one or more of the systems or subsystems illustrated in FIG. 6 (or not present at all).

The system 600 may include one or more processor(s) 602, any of which capable of performing the operations described herein. In some examples, the processor(s) 602 may be located remotely from the system 600. The one or more processor(s) 602 may comprise one or more central processing units (CPUs), one or more graphics processing units (GPUs), digital signal processors (DSPs), field programmable gate arrays (FPGAs), application specific integrated circuits (ASICs), or the like. In one example, the system 600 may include a model Jetson Xavier computing module available from Nvidia Corporation.

Memory 604 is an example of one or more non-transitory computer readable media capable of storing instructions which, when executed by any of the one or more processor(s) 602, cause the one or more processor(s) 602 to perform any one or more of the operations described herein (e.g., those described in reference to any of FIG. 1-5). The memory 604 can store an operating system and one or more software applications, instructions, programs, and/or data to implement the methods described herein and the functions attributed to the various systems. In various implementations, the memory 604 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. Additionally, or alternatively, the memory 604 is capable of storing raw sensor data from the one or more sensor(s) 612, compressed or downsampled sensor data, output (or intermediate representations) of one or more machine learning models (e.g., feature maps of neural networks), and/or representations of the raw sensor data.

Sensor(s) 612 may comprise one or more image sensor(s), radar(s), lidar(s), ultrasonic(s), touch sensors, Global Positioning and/or Navigation Satellite Systems, inertial measurement units (IMUs)—which may comprise one or more accelerometers, gyroscopes, and/or magnetometers, and the like, encoders (which may be associated with any one or more wheels or one or more blades), orientation sensors, Hall sensors, ammeters, voltmeters, power meters, location systems, battery management systems, motor sensors, etc. Image sensors may comprise, for example, RGB cameras, intensity cameras (e.g., greyscale or monochrome), stereo cameras, depth cameras (e.g., structured light sensors, time of flight (TOF) cameras, etc.), RGB-D cameras, infrared cameras, ultraviolet cameras, hyperspectral cameras, and the like. In those examples where multiple image sensors are contemplated, various image sensors may have varying fields of view. For example, where at least two image sensors are used, one image sensor may be a narrow field of view camera and the other a wide-angle field of view camera.

Sensor(s) 612 may further include, for example, ultrasonic transducers (e.g., SONAR), thermal imaging sensors (e.g., infrared imagers), non-contact temperature sensors (e.g., sensors capable of determining the temperature of a surface), ambient light sensors (e.g., light sensors such as, but not limited to, photodiodes capable of determining an intensity of light at 600-1200 nm), humidity sensors, pressure sensors, bolometers, pyrometers, wind speed sensors, and the like. Sensor data from such other sensors may be used to generate the three-dimensional maps and/or localize the system 600, such as in mapping/localization component 608. Any of the one or more sensor(s) 612 may also be associated with a timestamp including, but not limited to, a time of day, time of month, and/or time of year (e.g., Jan. 16, 2018 4:50 am UTC).

Sensors(s) 612 may also comprise a deck sensor comprising at least one sensor for determining a height of the blades relative to the grass and/or the chassis (e.g., a Hall effect sensor), and/or at least one sensor for measuring blade rotation parameters such as RPM, velocity, torque sensor or the like.

Such an example system 600 as shown in FIG. 6 may additionally or alternatively comprise one or more communication subsystems 514. An example communication subsystem 614 may be used to send and receive data either over a wired or wireless communication protocol, as well as provide data connectivity between any one or more of the processor(s) 602, memory 604, and sensors 612. Such protocols may include, but are not limited to, WiFi (502.11), Bluetooth, Zigbee, Universal Serial Bus (USB), Ethernet, TCP/IP, serial communication, cellular transmission (e.g., 4G, 5G, CDMA, etc.) and the like. As indicated herein, such a communication subsystem 614 may be used to send data (e.g., sensor data, control signals, etc.) to other systems (e.g. cloud-based computers, etc.). In at least some examples, to minimize an amount of data transferred (as raw sensor data may amount to upwards of multiple gigabytes to multiple terabytes per day), raw sensor data from the one or more sensors 612 may be downsampled or compressed before transmission. In at least one example, sensor data (whether raw, compressed, downsampled, a representation thereof, or otherwise) may be automatically uploaded to another computing device when in a particular location (e.g., when in a shed, or other preselected user location). Representations of data may include, for example, averages of the data, feature maps as output from one or more neural networks, extracted features of the data, bounding boxes, segmented data, and the like.

The system 600 may comprise actuator(s) 616, such as, but not limited to, one or more motors to provide torque to one or more drive wheels (e.g., 114(*a*), 114(*b*)) associated with the system 600, a deck actuator to raise and lower a blade platform or deck (though any other actuator is contemplated), one or more motors to spin associated one or more blades for cutting, one or more brakes associated with the one or more wheels, and the like. Such actuators may further comprise, for example, electric and/or mechanical motors, hydraulics, pneumatics, and the like. Upon receiving a signal from one or more of the planning and control subsystem 610, at least a portion of the actuator(s) may actuate in order to effectuate a trajectory (steering, acceleration, etc.), release fertilizer, seed, herbicide, pesticide, insecticide, seed, etc., and the like. One or more caster wheels (e.g., 115(*a*), 115(*b*) are passive and are free to move with the wheeled robot 102.

In one example, the drive motors may be one or more brushless DC motors, permanent magnet AC motors, AC induction motors, switched reluctance motors or the like. In one specific example, the motors may be a brushless DC motor, part number 53316, available from HydroGear driven by a motor controller, part number 53283, available from HydroGear. The motor controller circuits (power switching) may be separate from the motors or built into the motors. In one example, the motor controllers may operate on the Field Oriented Control (FOC) principle, a technique that allows a brushless motor to operate at very high efficiency. The motor controllers may use a three-phase half-H inverter design utilizing N-channel MOSFETs (e.g., SiC FETs or IGBTs). The motor controllers may utilize rotor feedback to facilitate accurate FOC motor control via encoders (e.g., inductive, optical, magnetic, or conductive), resolvers, Hall effect sensors, or "sensorless" through back EMF measurements from the motors themselves.

The actuator(s) for spinning the blades may be, for example, a brushless DC motor rotating the blades at, for example, about 1000 RPM up to about 5000 RPM when operating nominally. The deck actuator may comprise one or more linear actuator such as solenoid(s), ball screw(s), rack and pinion assembly(ies), hydraulic/pneumatic piston, or the like.

The actuator(s) 616 may further comprise a brake system. Such a brake system may be electronically controlled to perform braking and/or a brake assembly may be coupled to each motor to slow the rotation of each wheel independent, when braking is used to steer the mower, or slow rotation of both drive wheels 114(*a*), 114(*b*) simultaneously, when front wheel steering is used to steer the mower. In one example, the control subsystem 610 may use a friction-based braking system with friction pads (either disk, drum, or clutch style brakes) that are coupled to a motor shaft, either before or after a transmission or other gearing that may form part of each motor. The braking system may be electromagnetically actuated via a solenoid, linear actuator or other electric-motor driven mechanism. Using such a braking system enables the mower to be held at zero velocity when the mower is not being commanded to move. In addition, a friction based braking system saves power and prevents runaway mowers in the event of emergency stops or system failure. In addition to, or in lieu of, the friction braking system, the control subsystem 610 may utilize regenerative braking through control of the drive motors. In one example, regenerative braking is used for non-emergency braking during normal operation and friction braking is used during emergency stops and parking. With regenerative braking, energy from mower inertia is either transferred into the battery(ies) and/or into a brake resistor.

System 600 may also comprise a power system 618 including, but not limited to one or more of batteries, battery packs, fuel cells, super capacitors, or otherwise to provide power to the one or more processor(s) 602, actuators 616, sensor(s) 612, or any other component or subcomponent of the system 600 which requires power. The power system 618 may be removable such that the power system 618 can be removed and replaced when not operating within norms, e.g., recharge capacity is below a capacity threshold. The power system 618 may include multiple energy sources such as a battery or fuel cell for powering the mower electronics and a tank for gasoline, natural gas, hydrogen, or other fuel for powering one or more motors.

Though not illustrated for clarity, the system 600 may comprise one or more support circuits which may comprise circuits and devices that support the functionality of the processor(s) 602. The support circuits may comprise, one or more or any combination of: clock circuits, communications circuits, cache memory, power supplies, interface circuits for the various sensors, actuators, and communications circuits, and the like. More specifically, the support circuits may comprise sensor interfaces, communication circuit(s) interfaces, and actuator drive interfaces. The sensor interfaces may support data transfer from the sensor(s) 612 to the processor(s) 602 through one or more, or any combination of, data buffering/caching, signal digitizing, signal amplification, digital and/or analog signal processing, filtering, limiting, and/or the like.

The communication circuits interfaces may support data transfer to/from the communications circuits (e.g., LTE and/or WiFi transceivers) to/from the processor(s) 602 through one or more, or any combination of, digital and/or analog signal processing, filtering, limiting, amplifying, and/or the like. The communications circuits may comprise one or more communications transceivers (modems) and their associated antennas. In some examples, the communication circuits may include, but are not limited to, a pair of WiFi transceivers, a pair of LTE transceivers, or the like. The antennas generally may include a plurality of antennas to ensure diverse antenna positioning on the mower body to combat multi-path interference. A pair of transceivers may be used to provide redundancy. For example, two antennas for each transceiver (eight antennas total) may be mounted on either side of the body 102(*a*). The antennas for LTE/WiFi and GNSS may be collocated in a single antenna housing (dome). One such example of such an antenna is the Combo Outdoor IP67 Roof Antenna available from Teltonika.

The actuator drive interfaces may support control of the actuators 616 (e.g., drive motors, brake system, blade motors, deck actuator, etc.) through one or more, or any combination of, current, voltage or pulse width modulated signal controllers in the form of motor controllers, brake controllers, solenoid controllers and/or the like.

Within memory 604, a calibration component 606 may perform calibration of the one or more sensor(s) 612 and/or actuators 616. Calibration may comprise determining one or more sensor intrinsics and/or extrinsics, as well as determining positions of components or subcomponents (e.g., blade height), applied torques relative to currents applied, and the like. Such calibration protocols performed by calibration component 606 may ensure that any one or more components or subcomponents of system 600 is working properly and enable correct calculations to be generated given the system's 600 current understanding of the relative positions, orientations, and parameters of the other components and subcomponents.

A mapping/localization component 608 may take in sensor data from any one or more of the sensor(s) 612, in addition to any one or more outputs from the calibration component 606 to one or more of map an area and/or provide a position and/or orientation of the system 600 relative to the map. In at least one example, sensor data from the one or more sensor(s) 612 may be used to construct (and/or update) a two- and/or three-dimensional map of the scanned area. When updating, preexisting map data may be received from memory 604 and/or from server 630. Multiple mapping techniques may be used to construct a two- or three-dimensional map based on the acquired sensor data including, but not limited to SLAM, Kalman filters (Unscented Kalman Filters, Extended Kalman Filters, etc.), occupancy grids, bundle adjustment, sliding window filters, and the like. Such a map may be stored as a signed distance function (SDF), or truncated SDF (TSDF), triangle mesh, mosaics, etc. Use of voxel hashing may improve memory requirements for both storage and raycasting. In at least some examples, sensor data may include radar data indicative of subterranean objects (e.g., pipes, golf balls, rocks, etc.). Such subterranean objects may provide features for use in creating the map. For example, locations of sprinklers, piping, rocks, moisture levels, and the like may be combined (or fused) with other sensor data to both generate the maps and localize against them.

Furthermore, various combinations of sensor data may be used to provide additional insight as derived sensor data. As a non-limiting example, sensor data from wide-angle, dual baseline, image sensors may be used to reconstruct depth of the environment and provide additional features for use in generating the map and or localizing the system 600 against such a map. Any such derived sensor data may be either used for mapping and/or localization, as well as may be associated with the map after it has been generated (e.g., storing the value associated with the portion of the map where the data was collected). Further, in at least some examples, control signals (as may be received and/or generated by system 600) may be associated with the map at mapping and localization component 608. In some examples, GNSS data may be used to inform a Region of Interest (ROI) of satellite imagery to download to, or otherwise augment, the two- or three-dimensional map. Additionally, or alternatively, such a system 600 may download, or otherwise access, weather data as additional sensor data. The weather data may be indicative of, for example, weather conditions for the time of day associated with the other sensor data.

Such maps may comprise signed distance functions (SDFs) or truncated signed distance functions TSDFs, mesh representations, UTM grids, mosaics, tiles, etc., including any topological relationship between such sensor data. In some examples, voxel hashing may be used to minimize memory requirements for both map storage and retrieval. Such a map may also be associated with additional sensor data (and/or data derived from the additional sensor data, such as segmentations, classifications, output from machine learning algorithms, etc.). For example, moisture level data, soil density data, vegetative health indicators (growth, absence of growth, presence of pests, presence of weeds or invasive species, etc.), thermal data, ambient light data, etc. may be associated with every location in the three-dimensional map. Additionally, or alternatively, image sensor data (e.g., color) may be associated with the map as well (e.g., by weighted averaging, or the like), so that a user viewing the map would quickly see a virtual representation of the scanned area, including color.

The planning and control subsystem 610 may determine commands for operating one or more of the actuator(s) 616. In some examples, such a planning and control subsystem 610 may determine one or more trajectories for the system 600 to follow (e.g., by determining a series of steering commands, acceleration commands, etc. which cause the system 600 to follow an intended pattern). Such trajectories may be determined in accordance with waypoints (e.g., GNSS-based waypoints) as may be received from a user via control interface (not shown) and/or calculated to optimize (e.g., minimize) a length of travel over a defined region of interest (e.g., as may be determined by server 630), a quality of cut, or a time to mow an area, for example. In various examples, one or more of the waypoints and/or trajectories may be based at least in part on a motion plan received from one or more of motion planner 620 or motion planner 638.

Motion planners 620 and 638 may determine the trajectories and control torques to drive wheels of the system 600 in accordance with the methods of motion planning described herein. Thus, in examples, the motion planners 620 and 638 may receive path information and waypoints for movement of the system 600 and determine, based at least in part on a constant difference in angular velocities between first and second drive wheels of the system 600 and a pair of points along the path, a set of control torques for the first and second drive wheels to control the system 600 to move between a first point of the pair and a second point of the pair. The motion planners 620 and 638 may determine how to applying the set of control torques to the first and second drive wheels to move the system 600 along the path. Examples of which are described herein, such as with respect to any of FIGS. 1-5.

In any such example provided herein, such trajectories and/or controls may be calculated iteratively (and/or periodically) such that the system 600 (and/or associated user(s)) always has the most relevant information.

Multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the systems, techniques, and processes presented herein. Such systems, techniques, processes, etc. are not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g., A, AB, AB, ABC, ABB, etc.). When "and/or" is used, it should be understood that the elements may be joined in the alternative or conjunctive.

Example Clauses

A. A method for motion planning comprising:
- receiving a path for movement of a body of a wheeled robot having first and second drive wheels and at least one non-driven caster wheel, the path defined by a series of points;
- determining, based at least in part on a constant difference in angular velocities between the first and second drive wheels, a set of control torques for the first and second drive wheels to control the robot to move between a first point of the series of points and a second point of the series of points; and
- applying the set of control torques to the first and second drive wheels.

B. The method of clause A, wherein determining the set of control torques comprises:
determining a first trajectory to cause the robot to move from the first point to a third point; and
determining a second trajectory to cause the robot to move from the third point to the second point,
wherein the first and second trajectory are used to constrain at least one of a translational change between the first and second points, a directional change between the first and second points, or a velocity of the robot at the first point.

C. The method of clause A or B, wherein a magnitude of the difference in angular velocity between the first and second drive wheels is greater than 0.

D. The method of clauses A-C, wherein a difference in heading between the first point and the second point is not a multiple of 2π.

E. The method of clauses A-D, further comprising:
receiving additional paths at a frequency; and
repeating, for an additional path, the determining the set of control torques, wherein the set of control torques are determined at a frequency greater than the frequency of receiving additional paths.

F. The method of clauses A-E, wherein determining the set of control torques comprises solving a system of equations to determine constants of a temporally linear function, and wherein an angular velocity of the first drive wheel is based at least in part on the temporally linear function plus a difference and an angular velocity of the second drive wheel is based at least in part on the temporally linear function minus the difference.

G. The method of clause F, wherein the difference is an angular velocity of the body of the wheeled robot throughout a trajectory from the first point to the second point.

H. A system configured to generate a motion plan, the system comprising:
one or more processors; and
one or more non-transitory computer readable media having instructions stored thereon which, when executed by the one or more processors, cause the one or more processors to perform operations comprising:
receiving a path for movement of a body of a wheeled robot having first and second drive wheels and at least one non-driven caster wheel, the path defined by a series of points comprising a first point and a second point;
determining, based at least in part on a constant difference in angular velocities between the first and second drive wheels, a set of control torques for the first and second drive wheels to control the robot to move between the first point and the second point; and
applying the set of control torques to the first and second drive wheels.

I. The system of clause H, wherein determining the set of control torques comprises:
determining a third point;
determining a first trajectory to cause the robot to move from the first point to the third point; and
determining a second trajectory to cause the robot to move from the third point to the second point,
wherein the first and second trajectory are used to constrain at least one of a translational change between the first and second points, a directional change between the first and second points, or a velocity of the robot at the first point.

J. The system of clause H or I, wherein a magnitude of the difference in angular velocity between the first and second drive wheels is greater than 0.

K. The system of clauses H-J, wherein a difference in heading between the first point and the second point is not a multiple of 2π.

L. The system of clauses H-K, further comprising:
receiving additional paths at a frequency; and
repeating, for each additional path, the determining the set of control torques, wherein the set of control torques are determined at a frequency greater than the frequency of receiving additional paths.

M. The system of clauses H-L, wherein determining the set of control torques comprises solving a system of equations to determine constants of a temporally linear function, and wherein an angular velocity of the first drive wheel is based at least in part on the temporally linear function plus a difference and an angular velocity of the second drive wheel is based at least in part on the temporally linear function minus the difference.

N. One or more non-transitory computer readable media having instructions stored thereon which, when executed by one or more processors, cause the one or more processors to perform operations comprising:
receiving a path for movement of a body of a wheeled robot having first and second drive wheels and at least one non-driven caster wheel, the path defined by a series of points;
determining, based at least in part on a constant difference in angular velocities between the first and second drive wheels, a set of control torques for the first and second drive wheels to control the robot to move between a first point of the series of points and a second point of the series of points; and
applying the set of control torques to the first and second drive wheels.

O. The non-transitory computer readable media of clause N, wherein determining the set of control torques comprises:
determining a first trajectory to cause the robot to move from the first point to a third point; and
determining a second trajectory to cause the robot to move from the third point to the second point,
wherein the first and second trajectory are used to constrain at least one of a translational change between the first and second points, a directional change between the first and second points, or a velocity of the robot at the first point.

P. The non-transitory computer readable media of clauses N or O, wherein a magnitude of the difference in angular velocity between the first and second drive wheels is greater than 0.

Q. The non-transitory computer readable media of clauses N-P, wherein a difference in heading between the first point and the second point is not a multiple of 2π.

R. The non-transitory computer readable media of clauses N-Q, further comprising:
receiving additional paths at a frequency; and
repeating, for each additional path, the determining the set of control torques, wherein the set of control torques are determined at a frequency greater than the frequency of receiving additional paths.

S. The non-transitory computer readable media of clauses N-R, wherein determining the set of control torques comprises solving a system of equations to determine constants of a temporally linear function, and wherein an angular velocity of the first drive wheel is based at least in part on the temporally linear function plus a difference and an angular velocity of the second drive wheel is based at least in part on the temporally linear function minus the difference.

T. The non-transitory computer readable media of clause S, wherein the difference is an angular velocity of the body of the wheeled robot throughout a trajectory from the first point to the second point.

The invention claimed is:

1. A method for motion planning comprising:

receiving a path for movement of a body of a wheeled robot having first and second drive wheels and at least one non-driven caster wheel, the path defined by a series of points;

determining, based at least in part on a constant difference in angular velocities between the first and second drive wheels, a set of control torques for the first and second drive wheels to control the wheeled robot to move between a first point of the series of points and a second point of the series of points; and applying the set of control torques to the first and second drive wheels;

wherein determining the set of control torques comprises solving a system of equations to determine constants of a temporally linear function, and wherein an angular velocity of the first drive wheel is based at least in part on the temporally linear function plus a difference and an angular velocity of the second drive wheel is based at least in part on the temporally linear function minus the difference.

2. The method of claim 1, wherein determining the set of control torques comprises:

determining a first trajectory to cause the wheeled robot to move from the first point to a third point; and determining a second trajectory to cause the wheeled robot to move from the third point to the second point, wherein the first and second trajectory are used to constrain at least one of a translational change between the first and second points, a directional change between the first and second points, or a velocity of the wheeled robot at the first point.

3. The method of claim 1, wherein a magnitude of the difference in angular velocity between the first and second drive wheels is greater than 0.

4. The method of claim 1, wherein a difference in heading between the first point and the second point is not a multiple of 2π, such that as the robot moves between the first point of the series of points and the second point of the series of points, a movement of the at least one non-driven caster wheel is continuous.

5. The method of claim 1, further comprising:

receiving additional paths at a frequency; and repeating, for an additional path, the determining the set of control torques, wherein the set of control torques are determined at a frequency greater than the frequency of receiving additional paths.

6. The method of claim 1, wherein the difference is an angular velocity of the body of the wheeled robot throughout a trajectory from the first point to the second point.

7. A system configured to generate a motion plan, the system comprising:

one or more processors; and one or more non-transitory computer readable media having instructions stored thereon which, when executed by the one or more processors, cause the one or more processors to perform operations comprising:

receiving a path for movement of a body of a wheeled robot having first and second drive wheels and at least one non-driven caster wheel, the path defined by a series of points comprising a first point and a second point;

determining, based at least in part on a constant difference in angular velocities between the first and second drive wheels, a set of control torques for the first and second drive wheels to control the wheeled robot to move between the first point and the second point; and applying the set of control torques to the first and second drive wheels;

wherein determining the set of control torques comprises solving a system of equations to determine constants of a temporally linear function, and wherein an angular velocity of the first drive wheel is based at least in part on the temporally linear function plus a difference and an angular velocity of the second drive wheel is based at least in part on the temporally linear function minus the difference.

8. The system of claim 7, wherein determining the set of control torques comprises:

determining a third point;

determining a first trajectory to cause the wheeled robot to move from the first point to the third point; and determining a second trajectory to cause the wheeled robot to move from the third point to the second point, wherein the first and second trajectory are used to constrain at least one of a translational change between the first and second points, a directional change between the first and second points, or a velocity of the wheeled robot at the first point.

9. The system of claim 7, wherein a magnitude of the difference in angular velocity between the first and second drive wheels is greater than 0.

10. The system of claim 7, wherein a difference in heading between the first point and the second point is not a multiple of 2π.

11. The system of claim 7, further comprising:

receiving additional paths at a frequency; and repeating, for each additional path, the determining the set of control torques, wherein the set of control torques are determined at a frequency greater than the frequency of receiving additional paths.

12. One or more non-transitory computer readable media having instructions stored thereon which, when executed by one or more processors, cause the one or more processors to perform operations comprising:

receiving a path for movement of a body of a wheeled robot having first and second drive wheels and at least one non-driven caster wheel, the path defined by a series of points;

determining, based at least in part on a constant difference in angular velocities between the first and second drive wheels, a set of control torques for the first and second drive wheels to control the wheeled robot to move between a first point of the series of points and a second point of the series of points; and applying the set of control torques to the first and second drive wheels;

wherein determining the set of control torques comprises solving a system of equations to determine constants of a temporally linear function, and wherein an angular velocity of the first drive wheel is based at least in part on the temporally linear function plus a difference and an angular velocity of the second drive wheel is based at least in part on the temporally linear function minus the difference.

13. The non-transitory computer readable media of claim 12, wherein determining the set of control torques comprises:

determining a first trajectory to cause the wheeled robot to move from the first point to a third point; and determining a second trajectory to cause the wheeled robot to move from the third point to the second point, wherein the first and second trajectory are used to constrain at least one of a translational change between the first and second points, a directional change between the first and second points, or a velocity of the wheeled robot at the first point.

14. The non-transitory computer readable media of claim 12, wherein a magnitude of the difference in angular velocity between the first and second drive wheels is greater than 0.

15. The non-transitory computer readable media of claim 12, wherein a difference in heading between the first point and the second point is not a multiple of 2π.

16. The non-transitory computer readable media of claim 12, further comprising:

receiving additional paths at a frequency; and repeating, for each additional path, the determining the set of control torques, wherein the set of control torques are determined at a frequency greater than the frequency of receiving additional paths.

17. The non-transitory computer readable media of claim 13, wherein the difference is an angular velocity of the body of the wheeled robot throughout a trajectory from the first point to the second point.

* * * * *